M. H. BLANCHARD.
DRAFT ATTACHMENT.
APPLICATION FILED SEPT. 12, 1910.
1,015,260.
Patented Jan. 16, 1912.
2 SHEETS—SHEET 1.
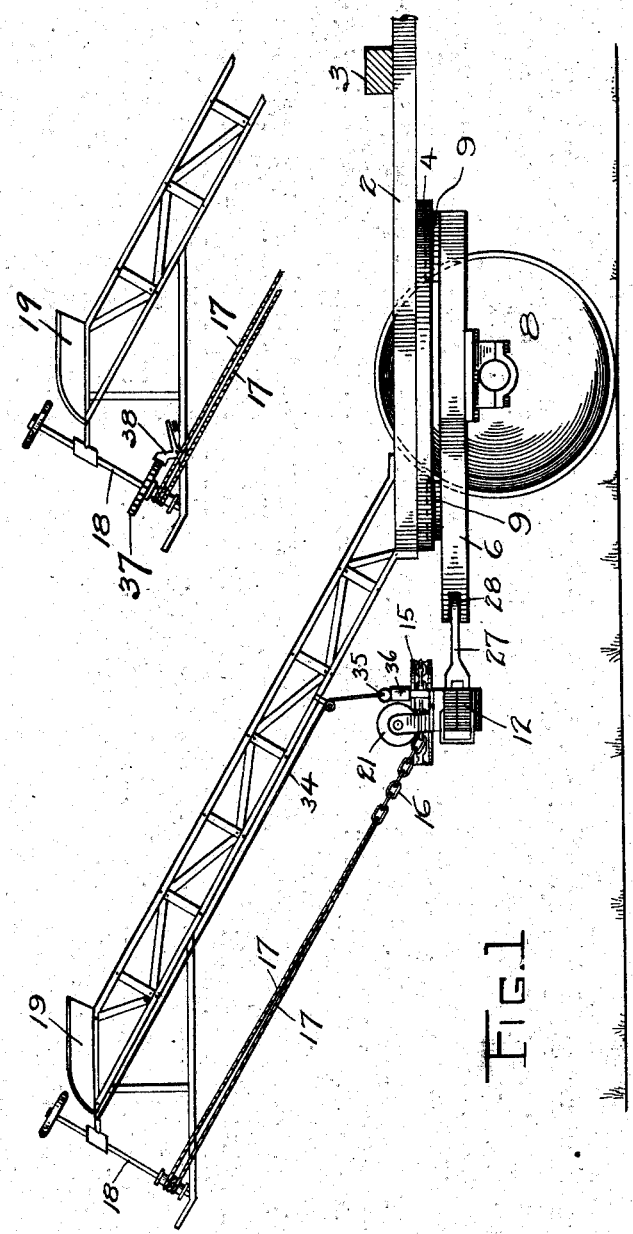
Witnesses:
Inventor
Martin H. Blanchard.
by Miller & White
Attorneys.

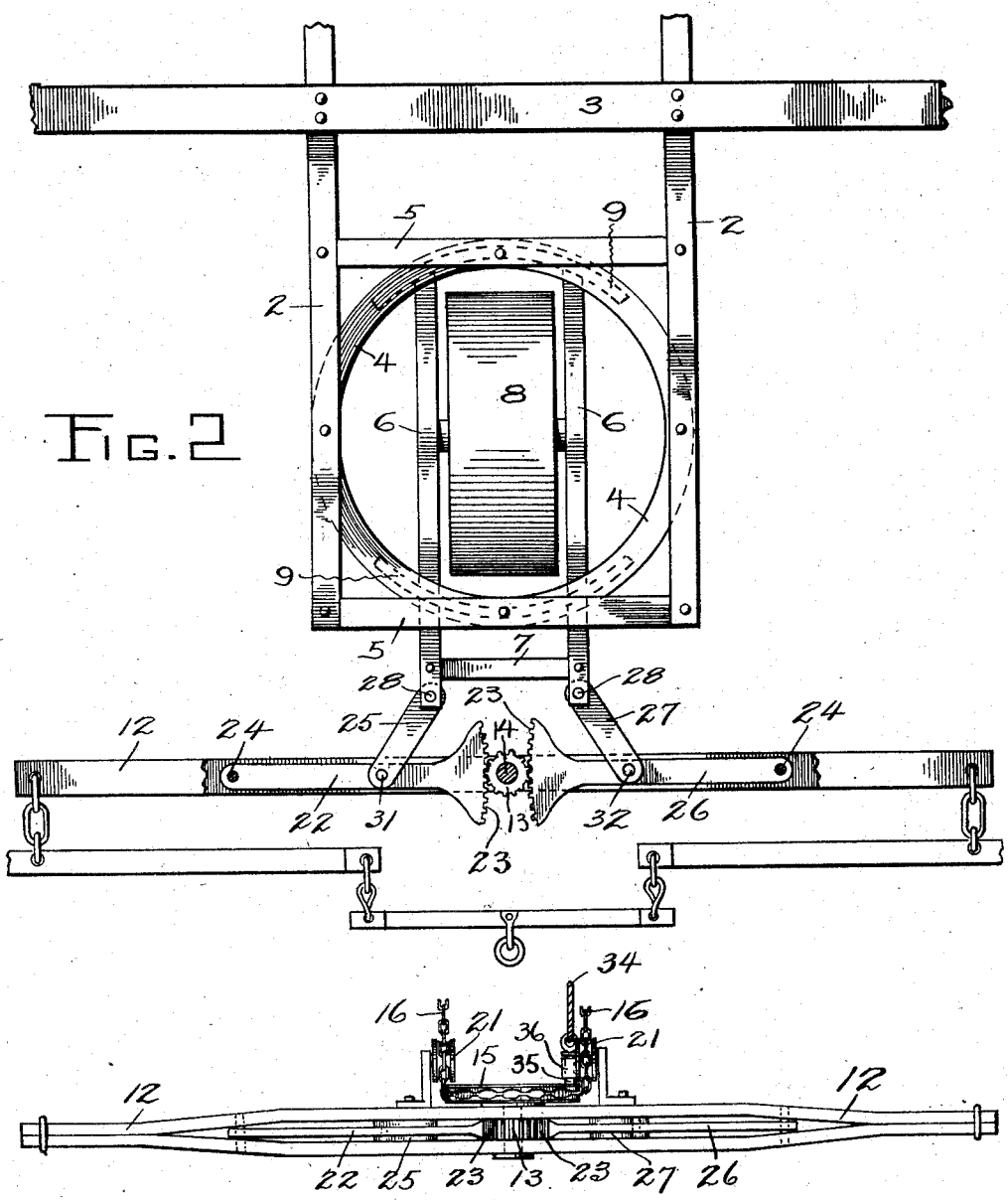

UNITED STATES PATENT OFFICE.

MARTIN H. BLANCHARD, OF DAVISVILLE, CALIFORNIA.

DRAFT ATTACHMENT.

1,015,260.  Specification of Letters Patent.  Patented Jan. 16, 1912.

Application filed September 12, 1910. Serial No. 581,653.

*To all whom it may concern:*

Be it known that I, MARTIN H. BLANCHARD, a citizen of the United States, and a resident of Davisville, county of Yolo, and State of California, have invented certain new and useful Improvements in Draft Attachments, of which the following is a specification.

The invention relates to improvements in draft appliances to be used in connection with harvesters and agricultural machines generally which are adapted to be drawn by horses or other draft animals.

The object of the invention is to provide a simple, strong and easily operable mechanism which will be particularly efficient in allowing an angular direction of motion of the harvester when the pull is straight ahead.

Another object of the invention is to provide a draft appliance in which the guide or steering wheel of the vehicle is inclined to the direction of pull by the force exerted by the draft animals.

Heretofore, in order to steer or change the direction of motion of the harvester, it has been necessary to swing the team in the direction that it is desirable to swing the vehicle. On account of the large number of horses used to pull the harvester, this operation is very unsatisfactory where short turns or abrupt deviations from the line of pull are necessary. In operating along banks of sloughs, or other irregular boundaries it is often desirable to swing the harvester a short distance to one side or the other in order to reach all the grain, and this has been heretofore impossible, it being necessary often to turn the harvester at the end of the run and come back and pass over the ground a second time. In hill side work, the system in use is objectionable due to the fact that the harvester has a tendency to slip down hill, or away from the grain when working from below the grain, and in order to hold it up to the work it is necessary to swing the team partly into the grain so that the line of pull will be at an angle to the direction of travel. And also when cutting in down or on the grain the drag on the header has a tendency to throw the harvester out of the line of pull. By the use of the attachment of my invention, the team is allowed to pull straight ahead over the ground which has already been cut and the steering wheel is set at the proper angle to hold the harvester up to the work.

This device possesses other advantageous features which with the foregoing will be set forth at length in the following description, where I shall outline in full that form of embodiment of the invention which I have selected for illustration in the drawings accompanying and forming part of the present specification. The novelty of the invention will be included in the claims succeeding said description. From this it will be apparent that I do not restrict myself to the showing made by such drawings and descriptions, as I may adopt many variations within the scope of my invention as expressed in said claims. In the said claims I have specified a vehicle, but it is to be understood that the invention is applicable to all structures which may be drawn, such as plows, harrows, and other agricultural implements.

Figure 1 is a side elevation of the front end of the harvester showing one means of operating the attachment of my invention. Fig. 2 is a plan or top view of the front end of the harvester, part of the main double-tree being broken away to disclose the operative mechanism. Fig. 3 is a front view of the main double-tree showing the relative positions of the various operative mechanisms. Fig. 4 shows a modification of the means for locking the segments of the double-tree in place.

The central longitudinal rails 2 of the harvester extend sufficiently in front of the forward cross-rail 3 to allow the circular bearing plate 4 to be attached thereto in advance of the rail 3. Cross rails 5, attached to the rails 2 are provided at suitable distance apart to brace the forwardly extending frame and to provide bearings for the bearing plate 4. An auxiliary frame composed of the rails 6 and 7 carries the guide or steering wheel 8. The rails 6 have arc shaped plates 9 mounted on the upper face in such position that they engage in a groove on the lower face of the bearing plate 4, and are movable in the groove to allow the guide wheel 8 to be turned to vary the direction of travel of the vehicle. The rails 6 extend in front of the frame of the vehicle and are adapted to be attached to the main double-tree 12. The main double-tree 12 is preferably formed as a truss, both to increase its strength and to provide for the placing of the mechanism whereby the frame carrying the steering wheel may be shifted without changing the direction of the pull. The two members of the truss forming the main double-tree are spread apart along the central portion to allow the various members of the mechanism to be arranged therebetween and to provide bearings for the various elements. The outer ends of the main double-tree are provided with the usual clevises for attaching the double-trees, swingle-trees or other draft apparatus.

A gear wheel 13 mounted on the vertical shaft 14 is arranged at the center of the main double-tree 12. Above the double-tree a chain wheel 15, or other operating device, is mounted on the same shaft 14, so that the rotation thereof will cause a rotation of the gear 13. A chain 16 passing around the chain wheel 15 is connected to a cable or rope 17 which is connected to a steering shaft 18 located adjacent to the driver's seat 19. Instead of extending forward and being controlled at the driver's seat 19, the cable 17 may pass backward and be controlled from a point in the rear, such as the seat of the man who attends to the operation of the header. For the purpose of preventing the chain from being unshipped from the chain wheel 15 during the movement of the chain, I provide guide wheels 21 on opposite sides of the wheel.

Arranged between the members of the truss forming the main double-tree and pivoted thereto at their outer ends 24, are the levers 22—26. The inner end of each lever is provided with a curved rack or segmental gear 23, meshing with the gear 13. It is evident, therefore, that as the gear 13 is revolved, the levers 22—26 move in opposite directions, due to racks 23 meshing on opposite sides of the gear 13. The levers 22—26 are attached to the wheel carrying frame 6 by the links 25—27 pivotally attached to the forward extension of the frame 6 at 28 and to the levers 22—26 at 31—32 respectively. Normally, the levers lie parallel with the main double-tree and the pull is exerted equally on both sides of the frame 6 with the result that the guide wheel 8 lies in the line of pull. In order to maintain the levers in this position for ordinary work, I have provided a locking pin 35 carried by a bracket 36 attached to the main double-tree in such position that it may be dropped into engagement with a seat or hole in the chain wheel 15 to hold the gear 13 fixed. A rope or chain 34 attached to the pin extends to a position adjacent to the driver's seat 19, so that the pin may be lifted from or dropped into engagement with the chain wheel 15 as the circumstances require. The aperture in the chain wheel to receive the pin is placed so that it occurs directly beneath the pin when the wheel is in such position that the levers 22—26 are parallel.

A modification of the locking mechanism is shown in Fig. 4, wherein the shaft 18, carrying the cable 17, is locked in any desired position. A toothed wheel 37 attached to the shaft is held fixed in any desired position by means of the pawl 38. This pawl may be operated by foot or by hand to engage or disengage the toothed wheel.

The operation of the mechanism is as follows: I will assume that the various parts are in normal inoperative position as shown in Fig. 2. The chain wheel 15 is operated to turn the gear 13 in a counter-clockwise direction, advancing lever 22, and depressing lever 26. It is evident that as the lever 22 moves forward and lever 26 moves backward, the greater proportion of the pull of the team will be transferred through the link 25 to that side of the frame 6 to which it is connected. This will operate to throw the frame 6 into the line of pull or toward that side to which the link 25 is connected. The guide wheel 8 will, therefore, be shifted and the machine or vehicle will incline toward the side to which the lever 22 is attached. During the operation the pull of the team has been straight ahead, and the direction of the vehicle has been inclined to the direction of the pull. The reverse operation is performed to bring the vehicle back to the line of pull, and if the course is then straight ahead, the gear 13 is locked in the inoperative position. In hill side work, where the vehicle has a tendency to slip down hill, the guide wheel is set at an angle so that the climb is equal to the slip. In this manner the harvester will move in the line of the pull and be held up to the standing grain.

I claim:

1. In a vehicle having a frame carrying a guide wheel, a draft attachment including a double-tree attached to said frame and provided with means for partially rotating the frame in a horizontal plane independent of the motion of the double-tree.

2. In a vehicle adapted to be drawn, a guide wheel, a double-tree, and means on the double-tree operative to vary the direction of movement of the guide wheel independent of the motion of the double-tree.

3. A draft attachment for vehicles provided with a steering wheel comprising means on the double-tree operative to vary the angular position of the steering wheel independently of the direction of pull of the team.

4. A draft attachment for vehicles having a steering wheel comprising oppositely disposed levers on the double-tree connected to opposite sides of the frame carrying the steering wheel, and means for oppositely varying the angular position of the levers to shift the frame about a vertical axis.

5. In a draft attachment for vehicles provided with a steering wheel, a double-tree, oppositely disposed levers on the double-tree pivoted at their outer ends, means for moving the inner ends of the levers in opposite directions and links connecting the levers to the frame carrying the steering wheel.

6. In a draft attachment for vehicles provided with a steering wheel, a double-tree, oppositely disposed levers thereon pivoted to the double-tree at their outer ends, a toothed gear wheel mounted at the center of the double-tree, segmental gears on the inner ends of the levers adapted to mesh on opposite sides of the gear wheel, means for revolving the gear wheel and means connecting the levers with the frame carrying the steering wheel.

7. In a draft attachment for vehicles provided with a steering wheel, a double tree, oppositely disposed levers thereon pivoted at their outer ends, a toothed gear wheel mounted at the center of the double-tree, segmental gears on the inner ends of the levers adapted to mesh on opposite sides of the gear wheel, means including a hand-wheel adjacent to the driver's seat for revolving the gear wheel, links connecting the levers to the frame carrying the steering wheel, and means for locking the gear wheel to hold the levers parallel to the double tree.

MARTIN H. BLANCHARD.

Witnesses:
GEO. B. HOAG,
S. H. McBRIDE.

---

Copies of this patent may be obtained for five cents each, by addressing the "Commissioner of Patents, Washington, D. C."